April 7, 1925.
E. MOWRY
1,533,025
HAYRAKE LOADER
Filed Jan. 19, 1921
2 Sheets—Sheet 1
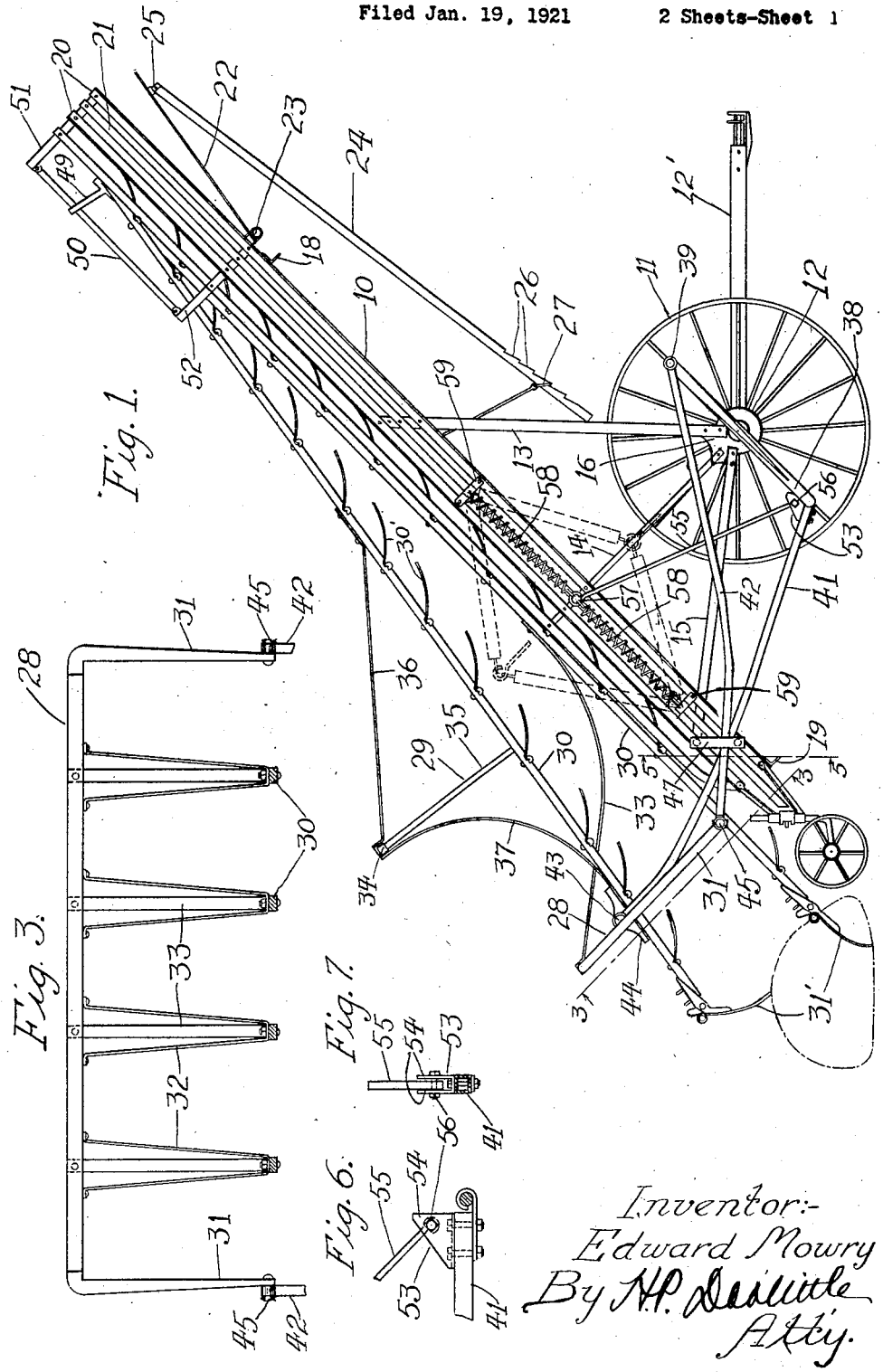
Inventor:-
Edward Mowry
By H.P. Doolittle
Atty.

April 7, 1925.  1,533,025
E. MOWRY
HAYRAKE LOADER
Filed Jan. 19, 1921   2 Sheets-Sheet 2
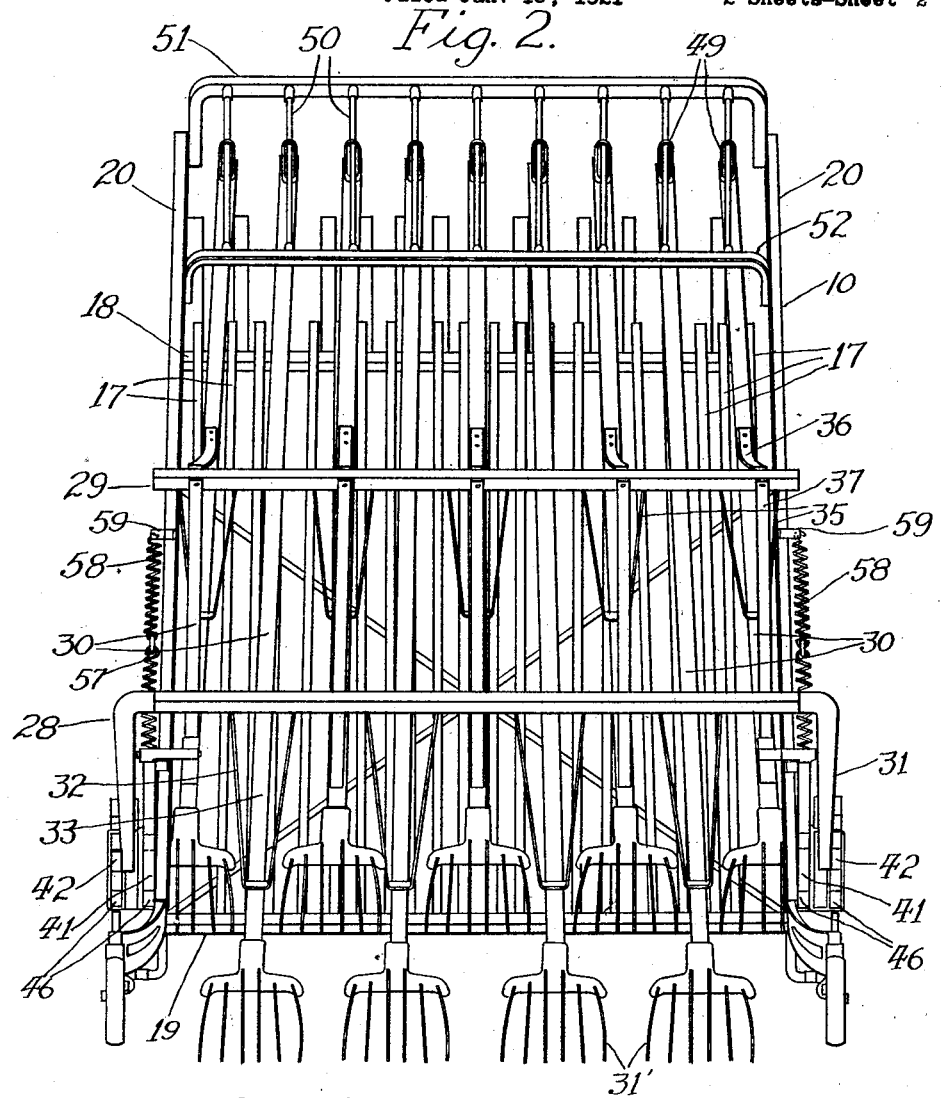
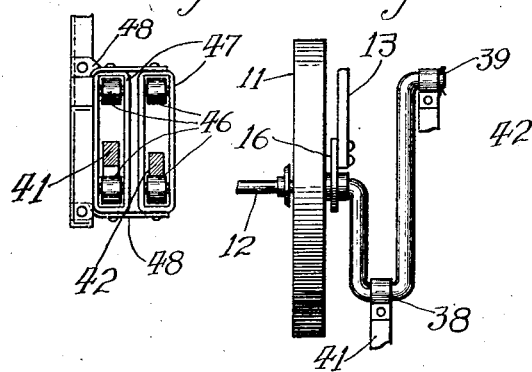
Inventor:-
Edward Mowry
By W.P. Devlin
Atty.

Patented Apr. 7, 1925.

1,533,025

UNITED STATES PATENT OFFICE.

EDWARD MOWRY, OF ROCK FALLS, ILLINOIS, ASSIGNOR TO INTERNATIONAL HARVESTER COMPANY, A CORPORATION OF NEW JERSEY.

HAYRAKE LOADER.

Application filed January 19, 1921. Serial No. 438,270.

*To all whom it may concern:*

Be it known that I, EDWARD MOWRY, a citizen of the United States, residing at Rock Falls, in the county of Whiteside and State of Illinois, have invented certain new and useful Improvements in Hayrake Loaders, of which the following is a full, clear, and exact specification.

This invention relates to hay loaders, and more particularly to those which are adapted to be connected to the rear end of a hay wagon or rack to gather and elevate the hay from the ground to the wagon.

In hay loaders of this type it is not uncommon to arrange the rake bars in groups, and to operate them alternately by rotary means, such as cranks and the like deriving their power from the ground wheels, and in order that the rake bars be given the proper motion to effectively perform their raking and elevating function, various devices have been employed to translate or modify the motion imparted by the driving means, such devices cooperating with the respective groups of bars and causing them to pursue, in their reciprocal motions a path of travel most effective for gathering and elevating the hay.

The present invention consists primarily of improved devices for thus translating or modifying the motion imparted to the rake bars by the driving means, such improved devices being characterized by the support of the respective groups of bars near their lower ends on a stationary fulcrum in such a manner that the rotary driving motion imparted by the ground wheels will cause the rake bars to act in a rectilinear line in their raking strokes, so as to properly gather the hay and at the completion of said stroke the rake bars will rise or lift the gathered hay on to the elevator bottom, where it will be subjected to the elevating action of the bars.

It further consists of improved means for balancing the rake carriers in a manner to overcome the jerking of the loader due to the reciprocating movement of the carriers.

The invention consists also of various improved features of construction in the general organization, which features will be fully described in the specification and the novel parts pointed out in the claims.

In the accompanying drawings:

Fig. 1 is a side elevational view embodying my invention.

Fig. 2 is a rear elevational view of the same.

Fig. 3 is a detail sectional view taken on the line 3—3 of Fig. 1.

Fig. 4 is a detail view of one of the carrying wheels and adjacent parts.

Fig. 5 is a detail sectional view of the roller for supporting the pitmans, taken on the line 5—5 in Fig. 1, and Fig. 6 and Fig. 7 are detail side elevational and end views respectively showing the connection between the pitman and the balancing springs.

The hay loader proper comprises an elevator or conveyor frame 10 mounted on carrying wheels 11 which are cross-connected by an axle 12 and a draft member 12'. The frame is supported by and secured to standards 13, bars 14 and 15. The standards 13, bars 14 and 15 are connected to the brackets 16 mounted on the axle 12. Slats 17 are secured together to form suitable bottoms for the conveyor by angle girders 18 and 19. Angles 20 and bar 21 form the sides of the conveyors. An adjustable conveyor section 22 is pivotally connected at 23 to the elevator frame and is held in the desired position by a strut 24 pivotally connected to the conveyor section at 25, and which has its lower end provided with a series of notches or teeth 26 which are adapted to engage a link 27 whereby the strut will be held in position to secure the adjustable conveyor in position to discharge hay from the elevator at the desired elevation on to the wagon.

A pair of alternating rake carriers 28 and 29 is provided with a series of rake bars 30. The lower ends of the rake bars 30 of the carrier 28 are cross-connected by an arch bar 31, by means of the brackets 32 and braces 33. Rake bars 30 of the carrier 29 are secured together by a bar 34 by means of hangers 35 and forward and rearward braces 36 and 37. The rake bars 30 are provided with a series of teeth 30' and pivoted rear teeth 31'.

In the operation of the hay loader in which the reciprocating rakes are used, a long substantially horizontal and rectilinear forward stroke of the raking member and a rapid upward stroke at the forward end of the horizontal movement is desirable in order to gather the hay and elevate the same on to the wagons. In the present invention this movement is imparted to the rake carriers by pitmans, the ends of which are connected to rotate concentrically with the wheel axle of the loader, while the other ends of the pitmans are connected to the rake carrier. These pitmans are curved and are guided in their movement by rollers fixed to the side of the loader in a manner that as the pitmans are reciprocated, the movement is translated to the rake carriers so that during a portion of the travel of the loader the series of rakes will sweep the ground clean and elevate the hay on to the elevator bottom.

Both ends of the wheel axle 12 are provided with a pair of oppositely disposed cranks 38 and 39 for driving the rakes. The cranks are preferably formed integrally with the axle and are connected to the rake carriers by the curved pitmans 41 and 42. The pitman 41 is pivotally connected at 43 to the carrier 29 thru the bearing bracket 44 fixed to the outside rake bar 30. The pitman 42 is pivotally connected at 45 to the arch bar 31 of the carrier 28. A pair of pitmans corresponding to 41 and 42 is located on the other side of the loader and operate simultaneously to reciprocate the rake carriers.

In order that the proper gathering and elevating movement may be imparted to the rake carriers the pitmans 41 and 42 are guided in their movement by the upper and lower rollers 46 journaled in the O shape brackets 47 secured to the side of the loader frame by straps 48 as shown in Fig. 5. It will be noted that as these curved pitmans are reciprocated over the rollers or guides that the desired rectilinear horizontal movement is imparted to the rake carriers in a manner to gather and elevate the hay from the ground to the hay rack. As this movement is imparted to the lower ends of the rake bar 30, the upper ends of these bars are supported in a manner to permit a free reciprocation by a substantially U shaped strap 49 fixed to each bar 30 and loosely embracing the longitudinally extending rods 50 secured at their forward end to the arch bar 51 and at their rearward end to the arch bar 52.

In order to overcome the jerking and unevenness of operation in this type of reciprocating rake loader, I have provided a balancing device which is identical for both sides of the loader and includes a bracket 53 secured to the forward end of the pitman 41 adjacent the crank 38. The bracket 53 is provided with vertically disposed walls 54 for the purpose of guiding in a vertical plane a link 55 pivotally secured to the bracket at 56 as shown in Fig. 7. The free end of the link is provided with an eye 57 which connects adjacent ends of the two oppositely disposed springs 58. The other ends of the springs 58 which are normally under tension are secured to the side of the loader by the arch brackets 59 in a manner to permit the free end of the link and springs to reciprocate without striking the side of the loader. From this construction it will be seen that when the pitman 41 and carrier 29 assume their rearmost position that the added weight of these members is to the rear of the fulcrum or rollers 46, and also in this position that the link 55 has forced the springs 58 to the position shown in the upper dotted lines in Fig. 1, in which position the springs have been further extended in a manner to assist the traction power to overcome the weight to the rear of the fulcrum or roller 46 in moving the carrier and rakes over their dead center position. Then when the crank 38 has traveled 180° from the position just described, the pitman 42 and carrier 28 will assume their rearmost position with the additional weight of the carrier 28 to the rear of the fulcrum or rollers 46; in this position the link 55 and springs 58 will take the position shown in the lower dotted lines in Fig. 1, where the springs 58 have again been further extended in a manner to equalize the weight of the carrier to the rear of the fulcrum or roller and to assist the carrier 28 and its rakes over their dead center position.

From the above description it will be seen that a simple and efficient equalizing or balancing mechanism has been provided to overcome the jerking and unevenness of operation due to the reciprocation of rake carriers. And also that a simple and efficient construction of a reciprocating hay loader has been provided with a minimum number of movable parts.

While I have described but one embodiment which my invention may assume, it is to be understood that modification may be made without departing from the spirit and scope of the appended claims.

That which I claim and desire to secure by Letters Patent is:

1. In a hay loader, the combination of an elevator frame, carrying wheels therefor, a plurality of reciprocating rake carriers, pitmans pivoted to said rake carriers, and connections mounted to travel concentrically with said wheels and connected to said pitmans, the pitmans engaging fulcrums fixed to said frame, said pitmans being curved substantially throughout their lengths, whereby they ride over the fulcrums for imparting a reciprocating and elevating movement to said carriers.

2. In a hay loader, the combination of an elevator frame, carrying wheels therefor, a plurality of reciprocating rake carriers, curved pitmans pivoted to said rake carriers, connections mounted to travel concentrically with said wheels and connected to said curved pitmans for operating said carriers, and stationary supports engageable with the curved portions of said pitmans for imparting a reciprocating and elevating movement to said rake carriers.

3. In a hay loader, the combination of an elevator frame, carrying wheels therefor, a plurality of reciprocating rake carriers, curved pitmans pivoted to said rake carriers, connections mounted to travel concentrically with said wheels and connected to said curved pitmans for operating said carriers, and stationary fulcrums over which the curved portions of said pitmans operate for imparting a reciprocating and elevating movement to said rake carriers.

4. In a hay loader, the combination of an elevator frame, carrying wheels, a plurality of reciprocating rake carries operatively driven thru said carrying wheels, and means comprising a plurality of oppositely disposed springs for balancing said reciprocating rake carriers.

5. In a hay loader, the combination of an elevator frame, carrying wheels therefor, a plurality of reciprocating rake carriers, a plurality of pitmans connected to said rake carriers and operatively connected to said carrying wheels, and means directly connecting the pitmans and said frame for balancing said reciprocating rake carriers.

6. In a hay loader, the combination of an elevator frame, carrying wheels therefor, a plurality of reciprocating rake carriers, a plurality of pitmans curved substantially throughout their lengths connected to said rake carriers and operatively connected to said carrying wheels, and means directly connecting the curved pitmans and frame for balancing said reciprocating rake carriers.

7. In a hay loader, the combination of an elevator frame, carrying wheels therefor, a plurality of reciprocating rake carriers, a plurality of pitmans connected to said rake carriers and operatively connected to said carrying wheels, and means comprising a plurality of oppositely disposed springs engaging a link and said link connected to said pitmans for balancing said reciprocating rake carriers.

8. In a hay loader, the combination of an elevator frame, a plurality of reciprocating rake carriers, a plurality of operatively driven pitmans connected to said rake carriers and operable over a fulcrum fixed to said frame, and means connected to said pitmans for equalizing the weight of the carriers on both sides of said fulcrum during the operation of said pitmans.

9. In a hay loader, the combination of an elevator frame, a plurality of reciprocating rake carriers, a plurality of operatively driven pitmans connected to said rake carriers and operable over fulcrums fixed to said frame, and resilient means connected to said pitmans for equalizing the weight of the carriers on both sides of said fulcrums during the operation of said pitmans.

10. In a hay loader, the combination of an elevator frame, carrying wheels therefor, a plurality of reciprocating rake carriers, a plurality of pitmans connected to said carriers and operatively connected to said carrying wheels, and a plurality of springs directly connecting said frame to said pitmans for balancing said repicrocating rake carriers.

11. In a hayloader, the combination of an elevator frame, carrying wheels therefor, a plurality of reciprocating rake carriers, pitmans pivoted to said rake carriers, connections mounted to travel concentrically with said wheels and connected to said pitmans for operating said carriers, stationary supports over which said pitmans operate for imparting a reciprocating and elevating movement to said rake carriers, and means for equalizing the weight of the carriers on both sides of said stationary supports.

12. In a hayloader, the combination of an elevator frame, carrying wheels therefor, a plurality of reciprocating rake carriers, pitmans pivoted to said rake carriers, connections mounted to travel concentrically with said wheels and connected to said pitmans for operating said carriers, stationary fulcrums over which said pitmans operate for imparting a reciprocating and elevating movement to said rake carriers, and means for equalizing the weight of the carriers on both sides of said stationary fulcrums.

13. In a hayloader, the combination of an elevator frame, carrying wheels therefor, a plurality of reciprocating rake carriers, pitmans pivoted to said rake carriers, connections mounted to travel concentrically with said wheels and connected to said pitmans for operating said carriers, stationary supports over which said pitmans operate for imparting a reciprocating and elevating movement to said rake carriers, and resilient means for equalizing the weight of the carriers on both sides of said stationary supports.

In testimony whereof I affix my signature.

EDWARD MOWRY.